(12) United States Patent
Bocciarelli et al.

(10) Patent No.: US 9,193,630 B2
(45) Date of Patent: Nov. 24, 2015

(54) POWDER COMPRISING STABILIZED ZIRCONIA GRANULES AND A BINDER HAVING TG OF 25C OR LOWER

(75) Inventors: Henri Bocciarelli, Pernes les Fontaines (FR); Nabil Nahas, Serris (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 82 days.

(21) Appl. No.: 13/518,565

(22) PCT Filed: Dec. 21, 2010

(86) PCT No.: PCT/IB2010/055993
§ 371 (c)(1),
(2), (4) Date: Sep. 12, 2012

(87) PCT Pub. No.: WO2011/077381
PCT Pub. Date: Jun. 30, 2011

(65) Prior Publication Data
US 2012/0326361 A1    Dec. 27, 2012

(30) Foreign Application Priority Data

Dec. 24, 2009   (FR) ...................................... 09 59581

(51) Int. Cl.
*B32B 5/16*     (2006.01)
*C04B 35/48*    (2006.01)
(Continued)

(52) U.S. Cl.
CPC ....... *C04B 35/62695* (2013.01); *C04B 35/4885* (2013.01); *C04B 35/62655* (2013.01);
(Continued)

(58) Field of Classification Search
USPC ............................. 428/402–405; 423/594.12; 501/103–105
See application file for complete search history.

(56) References Cited

U.S. PATENT DOCUMENTS

| 4,599,270 A | * | 7/1986 | Rangaswamy et al. | ....... 428/402 |
| 5,030,601 A | * | 7/1991 | Michel et al. | ................. 501/103 |

(Continued)

FOREIGN PATENT DOCUMENTS

| EP | 0517437 B1 | 3/1997 |
| WO | 89/01923 | 3/1989 |

OTHER PUBLICATIONS

International Search Report dated Apr. 27, 2011.
(Continued)

*Primary Examiner* — Holly Le
(74) *Attorney, Agent, or Firm* — Cooper Legal Gruop, LLC

(57) ABSTRACT

The invention relates to a granulated powder intended, in particular, for the production of ceramic sintered parts, said powder having the following chemical weight composition, based on dry matter, namely: a zirconia stabiliser selected from the group containing $Y_2O_3$, $Sc_2O_3$, MgO, CaO, $CeO_2$, and mixtures thereof, the weight content of stabiliser, based on the total zirconia and stabiliser content, being between 2% and 20% and the MgO+CaO content being less than 5% based on the total zirconia and stabiliser content; at least 1% of a first binder having a glass transition temperature less than or equal to 25° C.; 0-4% of an additional binder having a glass transition temperature greater than 25° C.; 5-50% alumina; 0-4% of a temporary additive different from the first binder and the additional binder, the total content of the first binder, the additional binder and the temporary additive being less than 9%; less than 2% impurities; and $ZrO_2$ to make up 100%. According to the invention, the median diameter $D_{50}$ of the powder is between 80 and 130 µm, the percentile $D_{99.5}$ is less than 500 µm and the relative density of the granules is between 30% and 60%.

25 Claims, 1 Drawing Sheet

(51) Int. Cl.
*C04B 35/488* (2006.01)
*C04B 35/106* (2006.01)
*C01G 25/02* (2006.01)
*C04B 35/626* (2006.01)
*C04B 35/634* (2006.01)

(52) U.S. Cl.
CPC ...... *C04B35/63416* (2013.01); *C04B 35/63424* (2013.01); *C04B 35/63488* (2013.01); *C04B 2235/3201* (2013.01); *C04B 2235/3206* (2013.01); *C04B 2235/3208* (2013.01); *C04B 2235/3224* (2013.01); *C04B 2235/3225* (2013.01); *C04B 2235/3229* (2013.01); *C04B 2235/3232* (2013.01); *C04B 2235/3272* (2013.01); *C04B 2235/3418* (2013.01); *C04B 2235/528* (2013.01); *C04B 2235/5409* (2013.01); *C04B 2235/5427* (2013.01); *C04B 2235/5436* (2013.01); *C04B 2235/5445* (2013.01); *C04B 2235/5481* (2013.01); *C04B 2235/6562* (2013.01); *C04B 2235/72* (2013.01); *C04B 2235/77* (2013.01); *C04B 2235/96* (2013.01)
USPC ...... 501/103; 423/594.12; 428/402; 501/104; 501/105

(56) References Cited

U.S. PATENT DOCUMENTS

| | | | | |
|---|---|---|---|---|
| 5,726,110 | A * | 3/1998 | Majumdar et al. | 501/104 |
| 5,910,462 | A * | 6/1999 | Gani et al. | 501/80 |
| 6,893,993 | B1 * | 5/2005 | Alexandrov | 501/103 |
| 2005/0079971 | A1 * | 4/2005 | Nawa | 501/105 |
| 2009/0115084 | A1 | 5/2009 | Moon | |
| 2012/0018007 | A1 * | 1/2012 | Villermaux et al. | 137/343 |
| 2012/0328879 | A1 * | 12/2012 | Nahas | 428/402 |
| 2013/0224498 | A1 * | 8/2013 | Sun et al. | 428/432 |

OTHER PUBLICATIONS

Dan Gutknecht "These Elaboration et caracterisation de mirco-et nano-composites alumine-zircone pour application orthoediue",L'Institut National des Sciences Appliquees de Lyon, No. 2006ISAL0067, Oct. 11, 2006, XP002594689, URL:http://www.google.fr/search?h]=fr&q=%22atomisation+barbotine+zircone%22, retrieved on Jul. 28, 2010, Table des matieres; p. 34, para 1.2.1.4 au fin de la p. 41; p. 46, para 2.1.2 au para 2.1.5.4.

Y. Mahiat: "La zircone: cette meconnue", Strategie prothetique, fevrier 2006, vol. 6 No. 1, Jan. 1, 2006, XP002594690, URL:http://www.eric-veyrat.fr/tropic1/zircone-meconnue.pdf, retrieved on Jul. 28, 2010, whole document.

C.W.Nies et al.: "Effect of Glass-Transition Temperature of Polyethylene Glyco 1-Plasticized Polyvilyl Alkohol on Granule Ompaction", J. Amer. Ceram. Soc., vol. 67, No. 4; Apr. 25. 1984, Apr. 25, 1983, Jan. 23, 1984, pp. 301-304, XP002594691, Chicago, Illinois (USA), whole document.

William J. Walker Jr. et al.: "Influence of Slurry Paremeters on Characteristics of Spray-Dried Granules", J. Am. Ceram. Soc. 82, (7), Jan. 1, 1999, pp. 1711-1719, XP002594692, N.Y. (USA), Part. III; Fig. 1,5,10,13,et 14; Table II.

Garvie RC, Hannink RH, Pascoe RT; Ceramic Steel? Nature; 258:703-4 (1975).

Ondik HM, McMurdie HF; Phase Diagrams for Zirconia and Zirconia Systems, The American Ceramics Society; pp. 100-118 (1998).

Lukasiewicz SJ; Spray-drying ceramic powders, Journal of the American Ceramic Society; 72[4] 617-24 (1989).

Matsui K; Initial Sintering Mechanism of 3mol% Yttria-doped Zirconia Powder: Effect of Alumina; Tosoh Research and Technology Review, vol. 51 (2007).

Lee EL, Rainforth WM; Ceramic Microstructures, Property Control by Process; 1st ed. pp. 18-21 (1994).

Hannink RHJ, Kelly PM, Muddle BC; Transformation Toughening in Zirconia-Containing Ceramics; Journal of the American Ceramic Society; 83[3]:461-487 (2000).

Whitman DW, Tang X, Cumbers DI, Ibbitson SA; Using Polymer Blends to Fine-Tune Binder Performance; The American Ceramics Society (1995).

Duramax-B-1000 and B1007 data sheets; Rohm and Haas Company, (2002).

Reed JS, Principles of Ceramics Processing, Second Edition, Chapter 12 (1995).

Zusoplast 9002 data sheet (2003).

Tosoh Zirconia Powder advertisement, www.ceramicbulletin.org (Jun. 2001).

Control of Ceramic Particle Properties by Spray Drying; Niro Limited, Powder Technology Division (Jul. 5, 1999).

Reed JS.; Principles of Ceramics Processing, Second Edition, section on Granulation, pp. 386-387 (1995).

Tosoh Zirconia Powder Specification and Typical Proiperties dated Aug. 2004.

Third Party Observation for Application No. EP2010814667.1, received by EPO Nov. 26, 2014.

* cited by examiner

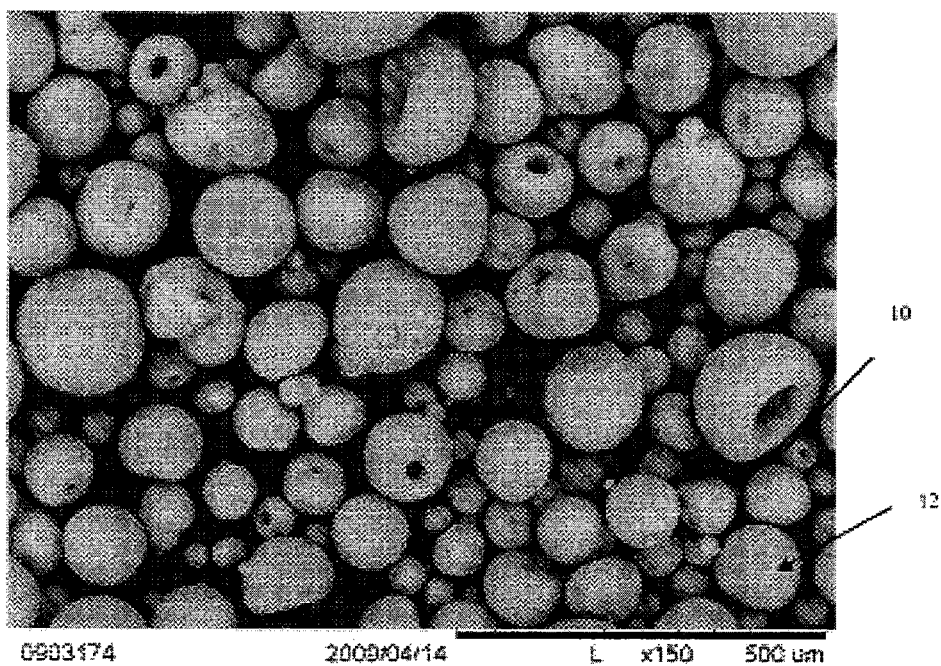

POWDER COMPRISING STABILIZED ZIRCONIA GRANULES AND A BINDER HAVING TG OF 25C OR LOWER

TECHNICAL FIELD

The invention relates to a powder comprising granules based on zirconia, to a process for the manufacture of such granules and to a sintered part obtained from such granules.

STATE OF THE ART

In a sintered part based on zirconia, the mechanical strength decreases with the amount of defects in the part and increases with the density.

JP8217448 describes the use of zirconia-based granules to increase the density after sintering and the three-point bending strength. These granules are obtained by spraying a slip, the weight per liter of which is regulated between 0.08 and 1.2 $g/cm^3$. This weight per liter is adjusted by vigorous stirring and by the use of foaming agents or foam inhibitors. The examples also disclose the addition, to the slip, of 3% of an acrylic resin, as percentage of the dry matter. These granules exhibit a diameter of between 0.01 and 0.2 mm, and a median diameter of approximately 60 microns. They make possible good filling of the mold during the manufacture of the preform and exhibit an ability to deform under the effect of the shaping pressure, which makes it possible to limit the number of defects present in the preform after pressing.

However, the granules described in JP8217448 are not suitable for the manufacture of parts having large dimensions, and in particular for the manufacture of parts exhibiting a volume of greater than 100 $cm^3$. This is because the parts having large dimensions obtained from the granules described in JP8217448 can exhibit, after sintering, cracks in their core and also surface defects, mainly peeling defects.

There exists a continuing need for a powder which makes it possible to manufacture a sintered part based on zirconia exhibiting a volume of greater than 100 $cm^3$, in particular for which all the dimensions are greater than 2 cm, having a good mechanical performance and a high density.

One aim of the invention is to meet this need.

SUMMARY OF THE INVENTION

The invention provides a powder comprising granules which is intended in particular for the manufacture of ceramic sintered parts, said powder exhibiting the following chemical composition by weight, based on the dry matter:
$ZrO_2$: remainder to 100%;
a zirconia stabilizer chosen from the group formed by $Y_2O_3$, $Sc_2O_3$, MgO, CaO, $CeO_2$, and their mixtures, the content by weight of stabilizer, on the basis of the sum of the contents of zirconia and stabilizer, being between 2.0% and 20%, and the MgO+CaO content by weight being less than 5.0%, on the basis of the sum of the contents of zirconia and stabilizer;
at least 1.0% of a first binder exhibiting a glass transition temperature (Tg) of less than or equal to 25° C.;
from 0 to 4.0% of an additional binder exhibiting a glass transition temperature of greater than 25° C.;
from 0 to 5.0% of alumina;
from 0 to 4.0% of a temporary additive other than a first binder and than an additional binder, the total content of said first binder, said additional binder and said temporary additive being less than 9.0%;
less than 2.0% of impurities;

the median diameter $D_{50}$ of the powder being between 80 and 130 μm, the percentile $D_{99.5}$ being less than 500 μm and the relative density of the granules being between 30% and 60%.

Preferably, more than 80%, more than 90% and indeed even substantially 100% of the granules exhibit a composition in accordance with the composition of the powder.

As will be seen in more detail in the continuation of the description, inventors have discovered that the specific distribution in the sizes of granules according to the invention makes it possible to obtain an excellent mechanical performance, provided that the total content of the first binder, of the additional binder and of the temporary additive is limited to less than 9.0%. This is because the inventors have found that, contrary to the usual practice consisting in increasing the content of binder in proportion to the median diameter, it was advantageous, in the claimed range of median diameters, to keep the content of first binder relatively low. In particular, they have discovered that this limitation on the content of first binder limits the appearance of permanent internal defects, that is to say defects not removed during the sintering of the preform obtained by pressing said granules.

The inventors have also found that, contrary to the usual practice consisting in adding binders exhibiting high glass transition temperatures, in order to improve the mechanical strength in the green state, it was advantageous to select binders exhibiting a glass transition temperature of less than 25° C. This is because they have found that this type of binder facilitates the deformation of the granules during the pressing without, however, unacceptably reducing their mechanical strength in the green state.

The use of a binder exhibiting a low glass transition temperature is contrary to a technical preconception according to which the mechanical strength in the green state is considered to decrease with the glass transition temperature of the binder.

A powder according to the invention can also comprise one or more of the following optional and preferred characteristics:
The relative density of the granules is between 40% and 50%.
The content of said stabilizer, on the basis of the sum of the contents of zirconia and stabilizer, is less than 15%, preferably less than 12%, preferably less than 10%, preferably less than 8%, preferably less than 6.5% and/or greater than 4%.
The granules incorporate particles of said stabilizer for which the median diameter is less than 0.8 μm, preferably less than 0.5 μm.
At least a portion of said stabilizer is replaced with an equivalent amount of precursor of said stabilizer.
The granules incorporate zirconia particles for which the median diameter ($D_{50}$) is less than 1 μm, preferably less than 0.8 μm, indeed even less than 0.5 μm.
The granules comprise alumina $Al_2O_3$, the alumina content being preferably greater than 0.1%, preferably greater than 0.2% and/or less than 2%, preferably less than 1%, more preferably less than 0.6%.
The first binder exhibits a glass transition temperature of greater than −30° C. and/or of less than 20° C., preferably of less than 15° C.
The first binder is chosen from amorphous organic polymers, polyacrylic resins, polymers based on pure acrylates, copolymers based on acrylates and styrene, and their blends. Preferably, the first binder is chosen from polyacrylic resins, polymers based on pure acrylates, copolymers based on acrylates and styrene, and their blends. More preferably, the first binder is chosen from polyacrylic resins, copolymers based on acrylates and styrene, and their blends.

Preferably, the zirconia and/or the first binder and/or the additional binder and/or the temporary additive, preferably the zirconia and the first binder and the additional binder and the temporary additive, are homogeneously distributed in the granules of the powder.

The first binder and/or the additional binder are chosen from polymers not comprising inorganic elements.

The content of temporary additive is less than 1%. Preferably, the temporary additive is an organic additive preferably chosen from dispersants or surfactants, thickeners, antifoaming agents, preservatives, lubricants and their mixtures.

The content of impurities is less than 1.0%, preferably less than 0.5%, indeed even less than 0.3%, indeed even less than 0.1%. Preferably, the impurities are oxides.

The median diameter ($D_{50}$) of the powder is greater than 90 µm and/or less than 120 µm.

The 10 percentile ($D_{10}$) is greater than 40 µm, preferably greater than 50 µm, more preferably greater than 60 µm.

The 90 percentile ($D_{90}$) is less than 300 µm, preferably less than 250 µm, more preferably less than 200 µm.

The 99.5 percentile ($D_{99.5}$) is less than 400 µm, more preferably less than 300 µm.

In an advantageous embodiment, the stabilizer is chosen from the group formed by $Y_2O_3$, $Sc_2O_3$ and their mixtures and the content of said stabilizer, on the basis of the sum of the contents by weight of zirconia and stabilizer, is less than 6.5%.

In an advantageous embodiment, the stabilizer is chosen from the group formed by MgO, CaO and their mixtures and the content of said stabilizer, on the basis of the sum of the contents by weight of zirconia and stabilizer, is less than 4%.

In an advantageous embodiment, the stabilizer is $CeO_2$ and the content of said stabilizer, on the basis of the sum of the contents by weight of zirconia and stabilizer, is greater than 10% and less than 15%.

In an advantageous embodiment, the stabilizer is chosen from the group formed by $Y_2O_3$, $CeO_2$ and their mixtures and preferably observes the relationship $10\% \leq 3.Y_2O_3 + CeO_2 \leq 20\%$, as percentage on the basis of the sum of the contents by weight of zirconia and stabilizer.

In an advantageous embodiment, the stabilizer is $Y_2O_3$, that is to say that the granules comprise only $Y_2O_3$ as stabilizer. In particular in this embodiment, the $Y_2O_3$ content is preferably greater than 3%, preferably greater than 4%, preferably greater than 4.5% and/or less than 6.5%, preferably less than 5.5%, on the basis of the sum of the contents by weight of zirconia and stabilizer.

The granules can comprise stabilized zirconia, or a mixture of stabilized or unstabilized zirconia particles and of particles of said stabilizer, or a mixture of particles in which stabilized or unstabilized zirconia and said stabilizer are intimately mixed. In one embodiment, the granules comprise particles in which the stabilized or unstabilized zirconia and the stabilizer are intimately mixed. Preferably, the granules comprise particles in which the zirconia is stabilized, that is to say that the stabilizer is in solid solution in the zirconia particles. Preferably, the granules comprise particles in which the stabilized zirconia and alumina are intimately mixed.

In a first specific embodiment, the stabilizer is $Y_2O_3$, the content of stabilizer is between 4.5% and 5.5%, on the basis of the sum of the contents by weight of zirconia and stabilizer, the alumina content is greater than 0.1% and less than 1%, preferably substantially equal to 0.25%, the content of first binder is between 2.5% and 4%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In a second specific embodiment, the stabilizer is $Y_2O_3$, the stabilizer content is between 4.5% and 5.5%, on the basis of the sum of the contents by weight of zirconia and stabilizer, the alumina content is greater than 0.1% and less than 1%, preferably substantially equal to 0.25%, the content of first binder is between 2.5% and 4%, the content of additional binder is between 0.5% and 2%, preferably between 0.5% and 1%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In a third specific embodiment, the stabilizer is $Y_2O_3$, the stabilizer content is between 4.5% and 5.5%, on the basis of the sum of the contents by weight of zirconia and stabilizer, the alumina content is greater than 0.1% and less than 1%, preferably substantially equal to 0.25%, the content of first binder is between 2.5% and 4%, the content of additional binder is between 0.5% and 2%, preferably between 0.5% and 1%, the content of temporary additive is between 0.5% and 1%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In a fourth specific embodiment, the zirconia stabilizer is $CeO_2$, the stabilizer content is between 10% and 15%, on the basis of the sum of the contents by weight of zirconia and stabilizer, the alumina content is greater than 0.1% and less than 1%, preferably substantially equal to 0.25%, the content of first binder is between 2.5% and 4%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In a fifth specific embodiment, the zirconia stabilizer is $CeO_2$, the stabilizer content is between 10% and 15%, on the basis of the sum of the contents by weight of zirconia and stabilizer, the alumina content is greater than 0.1% and less than 1%, preferably substantially equal to 0.25%, the content of first binder is between 2.5% and 4%, the content of additional binder is between 0.5% and 2%, preferably between 0.5% and 1%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In a sixth specific embodiment, the zirconia stabilizer is $CeO_2$, the stabilizer content is between 10% and 15%, on the basis of the sum of the contents by weight of zirconia and stabilizer, the alumina content is greater than 0.1% and less than 1%, preferably substantially equal to 0.25%, the content of first binder is between 2.5% and 4%, the content of additional binder is between 0.5% and 2%, preferably between 0.5% and 1%, the content of temporary additive is between 0.5% and 1%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In a seventh specific embodiment, the zirconia stabilizer is a mixture of $Y_2O_3$ and $CeO_2$, the $Y_2O_3$ content is between 1% and 2%, on the basis of the sum of the contents by weight of zirconia and stabilizer, the $CeO_2$ content is between 11% and 13%, on the basis of the sum of the contents by weight of zirconia and stabilizer, the alumina content is greater than 0.1% and less than 1%, preferably substantially equal to 0.25%, the content of first binder is between 2.5% and 4%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In an eighth specific embodiment, the zirconia stabilizer is a mixture of $Y_2O_3$ and $CeO_2$, the $Y_2O_3$ content is between 1% and 2%, on the basis of the sum of the contents by weight of zirconia and stabilizer, the $CeO_2$ content is between 11% and 13%, on the basis of the sum of the contents by weight of zirconia and stabilizer, the alumina content is greater than 0.1% and less than 1%, preferably substantially equal to 0.25%, the content of first binder is between 2.5% and 4%, the content of additional binder is between 0.5% and 2%, preferably between 0.5% and 1%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

In a ninth specific embodiment, the zirconia stabilizer is a mixture of $Y_2O_3$ and $CeO_2$, the $Y_2O_3$ content is between 1% and 2%, on the basis of the sum of the contents by weight of zirconia and stabilizer, the $CeO_2$ content is between 11% and 13%, on the basis of the sum of the contents by weight of zirconia and stabilizer, the alumina content is greater than 0.1% and less than 1%, preferably substantially equal to 0.25%, the content of first binder is between 2.5% and 4%, the content of additional binder is between 0.5% and 2%, preferably between 0.5% and 1%, the content of temporary additive is between 0.5% and 1%, and the content of impurities is less than 0.5%, preferably less than 0.1%, as percentages by weight based on the dry matter, and the residual moisture content is between 0.2% and 1%, preferably between 0.2% and 0.6%, as percentage by weight on the basis of the wet powder.

Preferably, a powder according to the invention is manufactured by spraying a slip, preferably according to a process comprising stages a) to d) described below.

Such a process advantageously makes it possible to manufacture granules exhibiting a relative density of less than 60%, indeed even of less than 50%.

The invention also relates to a process for the manufacture of a sintered part comprising the following stages:
A) mixing starting materials in order to form a starting charge,
B) forming said starting charge so as to obtain a preform,
C) optionally machining said preform,
D) sintering said preform, so as to obtain said sintered part,
E) optionally machining and/or grinding said sintered part,
this process being noteworthy in that the starting charge comprises a powder comprising granules in accordance with the invention.

The invention also relates to a preform obtained by the implementation of a process comprising at least stages A) and B), indeed even C), of a manufacturing process according to the invention.

The invention also relates to a ceramic sintered part obtained by sintering a preform, optionally machined, according to the invention. In particular, all the dimensions of the sintered part can be greater than 2 cm.

Definitions

"Binder" is understood to mean a constituent which, in a suitable amount, makes it possible, during a granulation operation, to form granules exhibiting, after drying, a cohesion which allows them to be handled, for example to be transferred from one container to another or to be poured into a mold (in particular under industrial conditions), without breaking. Preferably, this cohesion is at least that obtained with a polymer binder. The granulation operation is not limiting and comprises in particular spraying or the use of a granulator. The invention is thus not limited to granules manufactured by spraying.

"Temporary additive" is understood to mean a constituent which can be removed when it is subjected to a temperature of greater than or equal to 1000° C., for example during a sintering operation at a temperature of greater than or equal to 1000° C.

A precursor of a constituent is a compound capable, during sintering of a preform obtained from a powder according to the invention, of resulting in this constituent. The replacement of a constituent by an "equivalent" amount of a precursor of this constituent does not modify the amounts of said constituent in the sintered product obtained by sintering a powder according to the invention.

"Impurities" is understood to mean the inevitable constituents, involuntarily and necessarily introduced with the starting materials or resulting from reactions with these constituents. The impurities are not necessary constituents but only tolerated constituents.

"Granule" is understood to mean an agglomerate of particles, said agglomerate exhibiting a sphericity index of greater than 0.6, that is to say being provided in a substantially spherical form.

"Sphericity index" of a granule is understood to mean the ratio of its smallest diameter to its greatest diameter, the diameters being measured on photographs taken, for example, by optical microscopy at a magnification of ×10.

"Loose packed density" of a powder comprising granules is understood to mean the ratio equal to the weight of a known volume of said powder divided by said volume, the volume being filled by free fall of the powder, while avoiding vibrations. The loose packed density is determined according to standard NF EN 725-9 and is expressed in $g/cm^3$.

"Absolute density" of a powder comprising granules is conventionally understood to mean the ratio equal to the weight of dry matter of said powder, after grinding to a fineness such that substantially no closed pores remain, divided by the volume of this weight after grinding. It can be measured by helium pycnometry.

"True density" of a powder comprising granules is understood to mean the mean of the bulk densities of each granule of this powder.

"Bulk density" of a granule is conventionally understood to mean the ratio equal to the weight of the granule divided by the volume which said granule occupies.

"Relative density" of a powder comprising granules is understood to mean the ratio equal to the true density divided by the absolute density, expressed as a percentage.

"Glass transition temperature" of a binder is conventionally understood to mean the middle of the range of temperatures, known as "transition range", in which said binder gradually becomes more viscous and changes from the liquid state to the solid state. The glass transition temperature can be determined by differential scanning calorimetry (DSC). A list of the glass transition temperatures of the main families of polymers is given in the work Polymer Handbook (4$^{th}$ edition) 1999; 2005 John Wiley & Sons. The amplitude of a transition range is conventionally approximately 5 to 10° C.

The 10 ($D_{10}$), 50 ($D_{50}$) and 90 ($D_{90}$) percentiles or "centiles" of a powder are the particle sizes corresponding to the percentages, by weight, of 10%, 50% and 90% respectively on the cumulative particle size distribution curve of the particle sizes of the powder, the particle sizes being categorized by increasing order. For example, 10% by weight of the granules of a powder have a size of less than $D_{10}$ and 90% of the granules by weight have a size of greater than $D_{10}$. The sizes and the percentiles can be determined using a particle size distribution produced using a laser particle sizer. The 50 percentile $D_{50}$ is also conventionally referred to as "median diameter".

"Organic constituent" is conventionally understood to mean a constituent comprising only the elements carbon, oxygen, nitrogen and hydrogen, In a source of zirconia particles, $HfO_2$ cannot be separated chemically from $ZrO_2$. "$ZrO_2$" thus conventionally denotes the total content of these two oxides. According to the present invention, $HfO_2$ is not deliberately added to the starting charge. $HfO_2$ thus denotes only the traces of hafnium oxide, this oxide always being naturally present in the zirconia sources at contents generally less than 5%, indeed even of less than 2%. For reasons of clarity, the content of zirconia and of traces of hafnium oxide can thus be denoted without distinction by "$ZrO_2$+$HfO_2$" or by "$ZrO_2$" or also by "zirconia content".

"Comprising a" should be understood as "comprising at least one", unless otherwise indicated.

"A first binder" (or "an additional binder") does not necessarily correspond to just one compound but can correspond to a mixture of several compounds, each exhibiting a glass transition temperature of less than or equal to 25° C. (or greater than 25° C., respectively). Likewise, a "stabilizer" or a "temporary additive" can correspond to mixtures of several compounds each constituting a stabilizer or temporary additive respectively.

Unless otherwise indicated, all percentages are given based on the weight of the dry powder, with the exception of the percentages relating to the stabilizers. This is because the stabilizer content of an oxide is conventionally defined, by default, as a percentage by weight on the basis of the total content of said oxide and said stabilizer.

The properties of the powder can be evaluated by the characterization methods employed for the examples.

BRIEF DESCRIPTION OF THE FIGURES

Other characteristics and advantages of the invention will become more apparent on reading the description which will follow and on examining the appended drawing, in which FIG. 1 represents a photograph of the granules of example 6.

DETAILED DESCRIPTION

A powder comprising granules according to the invention can be manufactured by a process comprising a stage of spraying a slip. Such a process can in particular comprise the following stages:

a) preparing a slip by suspending, in a liquid, preferably in water, the various starting materials necessary in order to obtain, on conclusion of stage b), a powder comprising granules according to the invention;
b) spraying said slip, so as to form granules;
c) optionally sieving the granules obtained in stage b);
d) optionally drying the granules obtained in stage b) or c).

In stage a), the starting materials are mixed in a liquid, for example distilled water, so as to form a slip.

In the slip, the content by weight of dry matter can be between 35% and 70%. The content of dry matter in the slip is adjusted so that the relative density of the granules obtained on conclusion of stage b) is between 30% and 60%. An increase in this content is generally accompanied by an increase in the relative density of the granules obtained at the end of stage b).

Preferably, zirconia is introduced in the starting charge so that the powder comprising granules according to the invention exhibits a zirconia content of greater than 80%, indeed even of greater than 90%.

The zirconia introduced can be stabilized with said stabilizer. The stabilizer can also be added independently of the zirconia. In one embodiment, the zirconia can be introduced in the form of particles in which stabilized or unstabilized zirconia and stabilizer are intimately mixed, optionally with alumina particles.

According to a preferred embodiment, the zirconia is introduced in the form of stabilized zirconia particles, that is to say that the stabilizer is in solid solution in the zirconia particles.

In another preferred embodiment, the zirconia is introduced in the form of particles in which the stabilized zirconia and alumina are intimately mixed.

The use of particles of stabilized zirconia and/or of particles in which stabilized zirconia and alumina are intimately mixed is in particular preferred for the specific embodiments described above.

The binders are constituents of the starting charge which make possible the agglomeration during the spraying.

Conventionally, the manufacture of granules employs binders of the PVA or PEG type; binders of PVA type or PEGs having a molecular weight of greater than 600 Da do not exhibit a glass transition temperature (Tg) of less than or equal to 25° C. The inventors have discovered that the presence of a binder exhibiting a glass transition temperature (Tg) of less than or equal to 25° C., or "first binder", favors the deformation of the granules during the pressing and reduces the number of defects. It thus results in an improvement in the mechanical properties of the sintered part obtained from the powder according to the invention.

However, a content of first binder of less than 1% does not result in a quantifiable effect. Preferably, the first binder exhibits a glass transition temperature of greater than −30° C., preferably greater than −20° C., indeed even greater than −15° C., and/or of less than 20° C., indeed even of less than 15° C.

The first binder can be chosen from polymers. A list of such polymers is disclosed in Polymer Handbook (4th Edition), 1999; 2005, John Wiley & Sons. Preferably, the first binder is chosen from amorphous organic polymers and their blends. Preferably, the first binder is chosen from polymers based on acrylates (monomer —($CH_2$=CHCOO—)—), which are pure or in the form of copolymers (with styrene monomers, for example), and their blends. The polymer can thus be an acrylic resin. Preferably, the first binder is chosen from polymers based on pure acrylates (monomer —(CH$_2$=CHCOO—)—), copolymers based on acrylates (monomer —(CH$_2$=CHCOO—)—) and styrene (monomer —(C$_8$H$_8$)), and their blends.

Preferably, the first binder is chosen from organic polymers exhibiting, after curing, a breaking strength of greater than 1 N/mm$^2$, indeed even of greater than 5 N/mm$^2$, measured according to standard DIN53455.

Still preferably, the first binder is chosen from organic polymers exhibiting, after curing, an elongation at break of greater than 100%, preferably of greater than 200%, indeed even of greater than 500%, measured according to standard DIN53455.

Preferably, the first binder is chosen from polymers not comprising inorganic elements, in particular the elements from Group 1, in particular lithium (Li), sodium (Na) and potassium (K), and the elements from Group 17, in particular fluorine (F), chlorine (CO, bromine (Br) and iodine (I). Advantageously, the content of impurities is reduced and the mechanical strength of the sintered parts produced from the powders comprising granules according to the invention is increased.

Preferably, the content of first binder is determined so as to be greater than 2%, preferably greater than 2.5%, and/or less than 8%, preferably less than 6%, preferably less than 5%, preferably less than 4%, in the manufactured powder.

The additional binder is preferably chosen from polymers exhibiting a glass transition temperature of greater than 25° C. and less than 100° C., preferably less than 80° C., preferably less than 50° C., indeed even less than 40° C., and their blends.

Preferably, the content of additional binder is less than 3%, preferably less than 2%, more preferably less than 1% and/or greater than 0.5%.

Preferably, the additional binder is a polymer not comprising inorganic elements, in particular the elements from Groups 1 and 17. Advantageously, the content of impurities is reduced and the mechanical strength of the parts produced from the granules according to the invention is increased.

Preferably, the additional binder is chosen from amorphous organic polymers and their blends. Preferably, the additional binder is chosen from compounds based on alcohols. Preferably, the additional binder is chosen from polyvinyl alcohols and polyalkylene glycols, preferably chosen from polyethylene glycols having a molecular weight of greater than 600 Da.

A temporary additive can be added during the manufacture of the granules.

The temporary additive is preferably an organic additive which, according to rules well known to a person skilled in the art, can in particular be added to facilitate the manufacture of the granules or the forming thereof.

The content of temporary additive is preferably greater than 0.5% and/or less than 1%, the total content of binder(s) and of temporary additive preferably being less than 8%, preferably less than 6%, preferably less than 5%, indeed even less than 4%, as percentage by weight based on the dry matter. Preferably, the organic additive is chosen from dispersants or surfactants, thickeners, antifoaming agents, preservatives or biocides, lubricants and their mixtures. By way of example, dispersants or surfactants can be polyacrylates or ionic or nonionic surfactants, of the family of the Dolapix products sold by Zschimmer-Schwarz or alternatively of the Darvan products or methacrylic acids sold by R.T. Vanderbilt Company. The thickeners can be acrylic acid emulsions sold by Zschimmer-Schwarz or by BASF. The antifoaming agents can be those of the range sold by Zschimmer-Schwarz. The preservatives or biocides can be quaternary ammonium salts sold by Zschimmer-Schwarz or BASF. The lubricants can be those of the range sold by Zschimmer-Schwarz.

Preferably, the purity of the starting materials is determined so that the content of impurities in a powder comprising granules according to the invention is less than 1%, preferably less than 0.5%, indeed even less than 0.3%, indeed even less than 0.1%. The hafnium oxide is not regarded as an impurity.

Preferably, the impurities are oxides.

Preferably, the starting materials are chosen so that the granules do not comprise any other constituent than the zirconia, the zirconium stabilizer, the alumina, the binders, the temporary additive, the residual moisture and the impurities.

Preferably, the powders comprising zirconia, alumina and stabilizer are introduced into the slip before the optional temporary additive and binder(s).

Each of the different starting materials of the granules, in particular the powders comprising refractory oxides, preferably exhibits a median diameter of less than 50 μm, preferably less than 20 μm, preferably less than 10 μm, and/or a specific surface preferably of less than 30 m$^2$/g, preferably of less than 20 m$^2$/g.

At the end of stage a), the dry matter of the slip prepared preferably exhibits a median diameter of less than 1 μm, preferably of less than 0.5 μm, more preferably of less than 0.3 μm, and a specific surface of greater than 5 m$^2$/g, preferably of greater than 6 m$^2$/g, and/or of less than 30 m$^2$/g, preferably of less than 20 m$^2$/g.

To this end, in particular if the starting materials do not exhibit a suitable median diameter and/or a suitable specific surface, the slip is preferably dispersed or ground according to methods well known to a person skilled in the art, for example by passing the slip through a mill, preferably an attrition mill. This stage advantageously makes it possible to obtain good homogeneity of the different compounds of the desired powder at the end of stage a). In particular, this stage results in a substantially homogeneous distribution of the first binder in the granules of the powder.

If stage a) comprises a grinding operation, the optional additional binder and optional temporary additive, and also the first binder, are preferably introduced after this stage.

In stage b), the spraying results in particles exhibiting a low relative density of between 30% and 60%, unlike processes such as rolling granulation or drip casting, which conventionally result in high relative densities.

Preferably, the spraying is carried out such that the granules comprise residual moisture, the moisture content preferably being less than 1%, preferably less than 0.6%, and/or greater than 0.2%, as percentage by weight on the basis of the wet powder. Advantageously, a residual moisture content of greater than 0.2% contributes to the deformation of the granules under the effect of compression. However, a residual moisture content of greater than 1% can result in an increase in the number of surface defects of the preforms manufactured by pressing starting from a powder comprising granules according to the invention, for example subsequent to adhesion of said preforms to the walls of the molds used for the pressing.

More than 80% by number, preferably more than 90% by number, of the granules exhibit a sphericity index of greater than 0.6, preferably of greater than 0.7, preferably of greater than 0.8, preferably of greater than 0.9.

In stage c), the optional sieving is preferably carried out using a sieve with an opening of less than 500 μm, indeed even of less than 400 μm. Advantageously, this stage makes it possible to remove the coarsest granules, which can be of use in certain applications.

In stage d), the optional drying is preferably carried out at a temperature of between 80° C. and 110° C., for a period of time preferably greater than 2 hours.

Preferably, the process does not comprise stage d).

The inventors have found that a powder according to the invention can exhibit the following properties:

The relative density of the granules is preferably greater than 40% and/or less than 50%.

The loose packed density of the powder is greater than 1.4 g/cm$^3$, preferably greater than 1.5 g/cm$^3$, preferably greater than 1.6 g/cm$^3$, and/or less than 1.8 g/cm$^3$, preferably less than 1.7 g/cm$^3$.

The flowability of the powder is greater than 1 g/s, preferably greater than 1.5 g/s, preferably greater than 2 g/s.

A powder comprising granules according to the invention can be employed to manufacture a sintered part according to stages A) to E).

Stage A) can comprise stages a) and b), indeed even c) and/or d).

The starting charge can be composed of a powder comprising granules according to the invention.

In an alternative form, the starting charge can comprise a powder comprising granules according to the invention and one or more other powders. Preferably, the powder comprising granules according to the invention represents at least 60%, preferably at least 75%, preferably at least 90%, preferably at least 95%, of the weight of the starting charge.

In stage B), the forming is preferably carried out by pressing, plastic injection or extrusion, preferably by pressing. Preferably, the pressing is chosen from cold pressing and cold isostatic pressing techniques.

In the case of a forming by pressing, the starting charge is poured into a mold and then subjected to a pressure preferably of greater than 80 MPa and preferably of less than 200 MPa, indeed even less than 150 MPa, so as to form a green part, or "preform". The granules of the powder according to the invention are efficiently deformed under the effect of this pressure. The preform can then be removed from the mold.

In the optional stage C), the preform can be machined, according to any technique known to a person skilled in the art.

In stage D), the preform is sintered, preferably under air, preferably at atmospheric pressure or under pressure (hot pressing and/or hot isostatic pressing (HIP)) and at a temperature of between 1300° C. and 1500° C., preferably of greater than 1350° C. and/or of less than 1450° C., so as to form a sintered part.

Stages B) and D) can be carried out in a single stage, for example by a hot pressing.

In the optional stage E), the sintered part can be machined, according to any technique known to a person skilled in the art.

EXAMPLES

The following nonlimiting examples were manufactured according to a process comprising the above stages A) to E).

Stage A) exhibits the following stages a), b) and c).

In stage a), for each of the examples carried out, the zirconia powder, the main characteristics of which appear in table 1 below, is dispersed by microgrinding The alumina of this zirconia powder advantageously acts as sintering additive.

TABLE 1

| Yttrium-comprising zirconia powder | |
|---|---|
| ZrO$_2$ (% by weight) | Remainder to 100% |
| Y$_2$O$_3$ (% by weight) | 5.3 |
| Al$_2$O$_3$ (ppm) | 2500 |
| SiO$_2$ (ppm) | 100 |
| Na$_2$O (ppm) | 100 |
| CaO (ppm) | 30 |
| Fe$_2$O$_3$ (ppm) | 10 |
| MgO (ppm) | <20 |
| TiO$_2$ (ppm) | <20 |
| Specific surface (m$^2$/g) | 7 |
| D$_{10}$ (μm) | 0.2 |
| D$_{50}$ (μm) | 0.4 |
| D$_{90}$ (μm) | 1.0 |

This microgrinding is carried out in a wet bead mill (zirconia beads comprising 3 mol% of Y$_2$O$_3$, with a diameter of 0.8 mm) or attrition mill. After the microgrinding, the powder exhibits a median diameter of 0.35 μm. The dry matter content of the suspension is 50% by weight.

The binders, in the form of 50% by weight solutions, are subsequently added to the suspension.

The slip thus obtained is kept stirred for 12 hours.

In stage b), the slip is subsequently sprayed on an FSD Minor device sold by Gea Niro, with an inlet temperature of the sprayer of 280° C. and an outlet temperature of the sprayer of 100° C. On conclusion of stage b), a powder comprising granules is obtained.

In stage c), the powder comprising granules is sieved with a 400 μm sieve.

In stage B), and for each of the powders comprising granules obtained at the end of stage A), the following preforms were prepared:

pellets with a diameter of 32 mm and a weight of 8 grams were prepared by uniaxial pressing at a pressure of 100 MPa for the measurement of the bulk density, 10 bars exhibiting a cross section of 4×5 cm$^2$ and a length of 10 cm were produced by uniaxial pressing at a pressure of 100 MPa for the measurement of the yield, bars with a cross section of 1×1 cm$^2$ and with a length of 3 cm were prepared by uniaxial pressing at a pressure of 100 MPa for the measurement of the 3-point bending.

The preforms thus obtained were not subjected to stage C).

In stage D), said preforms were sintered according to the following cycle:

rise in temperature to 500° C. at 100° C./h, maintenance at 500° C. for 2 hours, rise in temperature up to 1450° C. at 100° C./h, maintenance at 1450° C. for 2 hours, decline in temperature by natural cooling.

In stage E), the bars intended for the 3-point bending measurements were machined to the dimensions required for carrying out this measurement (25×10×3 mm$^3$).

The properties of the examples were evaluated according to the following methods of characterization:

The dry matter is measured after drying at 110° C. for at least two hours.

The flowability of a powder comprising granules is measured with a device of "Ford cup" type, according to standard NF EN 658-5. The measurement consists in evaluating the time necessary for 200 g of powder to flow through a funnel with an internal diameter of 10 mm. The flowability of the powder is subsequently calculated by the ratio equal to the weight of powder divided by the time necessary for it to flow through the funnel.

The loose packed density of a powder comprising granules is measured by a device of "Ford cup" type, according to standard NF EN 725-9. The measurement consists in evaluating the weight of powder comprising granules introduced after filling a container having standard dimensions. The loose packed density is subsequently calculated by giving the ratio of the weight of powder to the volume of the container.

The absolute density of a powder comprising granules is measured by helium pycnometry on an AccuPyc 1330 device from Micromeretics®. The powder comprising granules is calcined beforehand at 500° C. for 2 hours.

The true density of a powder comprising granules is measured by mercury porosimetry on an AutoPores IV 9500 mercury porosimeter device sold by Micromeretics®. A weight of 1 gram of powder comprising granules is introduced into the device. After placing under low vacuum for 5 minutes, the mercury is introduced in steps of 3447 Pa (i.e., 0.5 psi). The true density is calculated by:

$$\text{True density} = \frac{\text{Weight of powder}}{\text{Total volume} - \text{Volume Hg 100 } psi}$$

the total volume being equal to the empty volume of the measurement chamber and the volume Hg 100 psi being the volume of mercury Hg introduced into the chamber in the presence of the powder at a pressure of 0.689 MPa (i.e., 100 psi).

The bulk density of a sintered part is measured on samples with a diameter of 30 mm and a thickness of 3 mm, obtained after pressing, at 100 MPa, the powder comprising granules according to the example under consideration, which samples are sintered according to the following cycle: rise to 500° C. at a rate of 100° C./h, stationary phase of 2 hours at 500° C., rise to 1450° C. at a rate of 100° C./h, stationary phase of 2 hours at 1450° C., decline to 500° C. at a rate of 200° C./h, then free cooling.

The modulus of rupture is measured on bars of 25×10×3 mm³ machined from parts obtained by pressing, at 100 MPa, the powder comprising granules according to the example under consideration, which bars are sintered according to the following cycle: rise to 500° C. at a rate of 100° C./h, stationary phase of 2 hours at 500° C., rise to 1450° C. at a rate of 100° C./h, stationary phase of 2 hours at 1450° C., decline to 500° C. at a rate of 200° C./h, then slow cooling.

The particle size distributions are determined using a Partica LA-950 laser particle sizer sold by Horiba. The powder comprising granules is directly introduced into the laser particle sizer for the measurement, without being suspended.

The chemical analysis is determined by X-ray fluorescence spectroscopy for the elements having a content of greater than 0.1% by weight; if the content of an element is less than 0.1% by weight, it is determined by ICP (Inductively Coupled Plasma) on a Vista AX model (sold by Varian).

The sphericity index is measured on a Morphologi 3G device sold by Malvern Instruments. The powder comprising granules is directly introduced into the device for measurement. The sphericity index of a granule is determined by the ratio of the smallest diameter to the greatest diameter, measured on a photograph of the granule taken by optical microscopy at a magnification of ×10. In order to measure the percentage of granules exhibiting a specific sphericity, statistical counting is carried out with regard to the granules observed on from 500 to 1000 photographs.

The modulus of rupture in 3-point bending is measured according to standard NF EN 658-5, on a Lloyd press, with a distance between external supports of 15 mm, on bars with a length equal to 25 mm, with a width equal to 10 mm and with a thickness equal to 3 mm.

The nature and the content of temporary additive and of binder(s), in particular made of polymers, are measured by infrared spectroscopy on a Spectrum 400 device sold by Perkin Elmer. The intensity data are recorded over a 4000-1000 $cm^{-1}$ range with a step of 1 $cm^{-1}$. The polymers are identified by comparison with the FTIR (Fourier Transform InfraRed spectroscopy) data given, for example, in the work "Handbook of Fourier transform Raman and infrared spectra of polymers", A. H. Kuptsov and German Nikolaevich Zhizhin, vol. 45, 1998, Elsevier. The nature and the content of polymers can also be confirmed by other well known methods, such as liquid phase chromatography (HPLC) equipped with separation column(s) suited to the nature and to the number of compounds to be separated. A device such as the Surveyor Plus, sold by Thermo Scientific, equipped with a Hypersil Gold column with a diameter of 1.9 µm, can be employed.

The total content of temporary constituents is determined by the difference between the weight of powder after calcination at 1000° C. and the weight of powder after drying at 110° C., with respect to the total weight after drying.

The manufacturing yield corresponds to the percentage of "conforming" sintered parts, that is to say sintered parts exhibiting neither cracks, including in their core, nor surface defects, on the basis of the number of sintered parts manufactured.

TABLE 2

| Example | 1 | 2 | 3 | 4 | 5 | 6 | 7 | 8 | 9 |
|---|---|---|---|---|---|---|---|---|---|
| Chemical analysis of the granules (% by weight after drying at 110° C. for 2 h) | | | | | | | | | |
| $ZrO_2$ | Remainder to 100 | | | | | | | | |
| $Y_2O_3$ | 5.4 | 5.4 | 5.4 | 5.4 | 5.4 | 5.4 | 5.4 | 5.4 | 5.4 |
| $Al_2O_3$ | 0.25 | 0.25 | 0.25 | 0.25 | 0.25 | 0.25 | 0.25 | 0.25 | 0.25 |
| Binders | 3 | 3 | 3 | 8 | 10 | 3 | 3 | 3 | 3 |
| Impurities | <0.1 | <0.1 | <0.1 | <0.1 | <0.1 | <0.1 | <0.1 | <0.1 | <0.1 |

TABLE 2-continued

| Example | 1 | 2 | 3 | 4 | 5 | 6 | 7 | 8 | 9 |
|---|---|---|---|---|---|---|---|---|---|
| Residual moisture after drying at 110° C. for 2 hours, in percent by weight (without preliminary drying) | | | | | | | | | |
| | 0.4 | 0.4 | 0.4 | 0.5 | 0.6 | 0.4 | 0.4 | 0.4 | 0.4 |
| Binders | | | | | | | | | |
| Acrylic resin (Tg = −10° C.) | — | — | — | — | — | — | — | 2.5 | — |
| Acrylic resin (Tg = 10° C.) | 2.5 | — | — | 7 | 8 | 2.5 | 2.5 | — | — |
| Acrylic resin (Tg = 20° C.) | — | — | — | — | — | — | — | — | 2.5 |
| PEG 4000 (Tg = 35° C.) | 0.5 | — | 3 | 1 | 2 | 0.5 | 0.5 | 0.5 | 0.5 |
| PEG 20 000 (Tg = 45° C.) | — | 1 | — | — | — | — | — | — | — |
| PVA, 95% hydrolyzed (Tg = 70° C.) | — | 2 | — | — | — | — | — | — | — |
| Properties of the powder comprising granules | | | | | | | | | |
| $D_{10}$ (μm) | 30 | 70 | 70 | 70 | 70 | 70 | 70 | 70 | 70 |
| $D_{50}$ (μm) | 60 | 110 | 110 | 110 | 110 | 110 | 110 | 110 | 110 |
| $D_{90}$ (μm) | 100 | 200 | 200 | 200 | 200 | 200 | 200 | 200 | 200 |
| $D_{99.5}$ (μm) | 200 | 300 | 300 | 300 | 300 | 300 | 300 | 300 | 300 |
| Sphericity index | >0.8 | >0.8 | >0.8 | >0.8 | >0.8 | >0.8 | >0.8 | >0.8 | >0.8 |
| Relative density (%) | 40 | 50 | 45 | 38 | 38 | 50 | 40 | 40 | 40 |
| Loose packed density (g/cm³) | 1.15 | 1.60 | 1.5 | 1.45 | 1.4 | 1.60 | 1.60 | 1.60 | 1.60 |
| Flowability (g/s) | 0.6 | 2 | 2 | 2 | 2 | 2 | 2 | 2 | 2 |
| Properties of the sintered part obtained after pressing the granules and sintering at 1450° C. | | | | | | | | | |
| Bulk density (g/cm³) | 6.05 | 5.9 | 5.9 | 6.02 | 5.9 | 6.04 | 6.05 | 6.05 | 6.04 |
| Modulus of rupture in 3-pt bending (MPa) | 1200 | 850 | 900 | 1100 | 900 | 1150 | 1200 | 1200 | 1150 |
| Manufacturing yield | 40% | 100% | — | — | — | 90% | 100% | — | — |

As represented in FIG. 1, the granules 10 according to example 6 are substantially toric. They thus exhibit an orifice 12 which passes right through them, passing through their center. The sphericity index of these granules is greater than 0.8.

The inventors believe that the ability to fill a mold can be evaluated by the loose packed density of the powder and by its flowability. A high loose packed density and a high flowability value correspond to a good ability to fill a mold.

Table 2 makes it possible to make the following observations:

The powder comprising granules of example 1, using the same binders as the powder of examples 6 and 7, exhibits a lower loose packed density and a lower flowability value. Its ability to fill a mold is lower than those of the powders of examples 2 to 7. The manufacturing yield for parts with dimensions of 10×5×4 cm³ (volume of 200 cm³) is much lower than that obtained with the powders comprising granules of examples 2, 6 and 7, which illustrates the advantage of a median diameter $D_{50}$ of greater than 80 μm.

The powders comprising granules of examples 2 and 3, using binders not exhibiting a glass transition temperature of less than 25° C., do not make it possible, after pressing and sintering, to obtain a sintered part exhibiting a high density and a high modulus of rupture in 3-point bending.

Unlike the powder comprising granules of example 4, exhibiting a total content of binders of 8%, the powder comprising granules of example 5, exhibiting a total content of binders of greater than 9%, does not make it possible, after pressing and sintering, to obtain a sintered part exhibiting a high density and a high modulus of rupture in 3-point bending.

The powder comprising granules of example 8 according to the invention comprises 2.5% of an acrylic resin exhibiting a glass transition temperature equal to −10° C.

The powder comprising granules of example 9 according to the invention comprises 2.5% of an acrylic resin exhibiting a glass transition temperature equal to 20° C.

The powders comprising granules of examples 6 and 7 according to the invention make it possible to manufacture, with high yields, sintered parts having a high volume and/or exhibiting noteworthy mechanical properties.

Of course, the invention is not limited to the embodiments given as examples.

In particular, the bulk density of a sintered part according to the invention is not limiting.

In addition, other processes than spraying can be employed to manufacture a powder comprising granules according to the invention, for example a process involving a lyophilization stage, or a process involving a fluidized bed granulation stage, or a stage of granulation using a paddle mixer.

The invention claimed is:

1. A powder comprising granules which is intended in particular for the manufacture of ceramic sintered parts, said powder exhibiting the following chemical composition by weight, based on the dry matter:
   $ZrO_2$: remainder to 100%;
   a zirconia stabilizer chosen from the group formed by $Y_2O_3$, $Sc_2O_3$, MgO, CaO, $CeO_2$, and their mixtures, the content by weight of stabilizer, on the basis of the sum of the contents of zirconia and stabilizer, being between 2.0% and 20%, and the MgO+CaO content by weight being less than 5.0%, on the basis of the sum of the contents of zirconia and stabilizer;
   at least 1.0% of a first binder exhibiting a glass transition temperature of less than or equal to 25° C.;
   from 0 to 4.0% of an additional binder exhibiting a glass transition temperature of greater than 25° C.;
   from 0 to 5.0% of alumina;
   from 0 to 4.0% of a temporary additive other than a first binder and than an additional binder, the total content of said first binder, said additional binder and said temporary additive being less than 9.0%;
   less than 2.0% of impurities;

the median diameter $D_{50}$ of the powder being between 80 and 130 μm, the percentile $D_{99.5}$ being less than 500 μm and the relative density of the granules being between 30% and 60%.

2. The powder as claimed in claim 1, in which:
the stabilizer is chosen from the group formed by $Y_2O_3$, $Sc_2O_3$ and their mixtures and the content of said stabilizer is less than 6.5%, on the basis of the sum of the contents by weight of zirconia and stabilizer; or
the stabilizer is chosen from the group formed by MgO, CaO and their mixtures and the content of said stabilizer is less than 4%, on the basis of the sum of the contents by weight of zirconia and stabilizer; or
the stabilizer is $CeO_2$ and the content of said stabilizer is greater than 10% and less than 15%, on the basis of the sum of the contents by weight of zirconia and stabilizer.

3. The powder as claimed in claim 1, in which the stabilizer is chosen from the group formed by $Y_2O_3$, $CeO_2$ and their mixtures and observes the relationship 10%<3.Y2O3+CeO2≤20%, the contents by weight being expressed on the basis of the sum of the contents by weight of zirconia and stabilizer.

4. The powder as claimed in claim 1, in which $Y_2O_3$ is the sole stabilizer and the $Y_2O_3$ content is greater than 3% and less than 6.5%, on the basis of the sum of the contents by weight of zirconia and stabilizer.

5. The powder as claimed in claim 1, in which:
the stabilizer is $Y_2O_3$,
the stabilizer content is between 4.5% and 5.5%, on the basis of the sum of the contents by weight of zirconia and stabilizer,
the alumina content is greater than 0.1% and less than 1%, as percentage by weight based on the dry matter,
the content of first binder is between 2.5% and 4%, as percentage by weight based on the dry matter,
the content of impurities is less than 0.5%, as percentage by weight based on the dry matter, and
the residual moisture content is between 0.2% and 1%, as percentage by weight on the basis of the wet powder.

6. The powder as claimed in claim 5, in which the content of additional binder is between 0.5% and 1%, as percentage by weight based on the dry matter.

7. The powder as claimed in claim 6, in which the content of temporary additive is between 0.5% and 1%.

8. The powder as claimed in claim 1, in which:
the zirconia stabilizer is $CeO_2$,
the stabilizer content is between 10% and 15%, on the basis of the sum of the contents by weight of zirconia and stabilizer,
the alumina content is greater than 0.1% and less than 1%, as percentage by weight based on the dry matter,
the content of first binder is between 2.5% and 4%, as percentage by weight based on the dry matter,
the content of impurities is less than 0.5%, as percentage by weight based on the dry matter, and
the residual moisture content is between 0.2% and 1%, as percentage by weight on the basis of the wet powder.

9. The powder as claimed in claim 1, in which:
the zirconia stabilizer is a mixture of $Y_2O_3$ and $CeO_2$,
the $Y_2O_3$ content is between 1% and 2%, as percentage on the basis of the sum of the contents by weight of zirconia and stabilizer,
the $CeO_2$ content is between 11% and 13%, as percentage on the basis of the sum of the contents by weight of zirconia and stabilizer,
the alumina content is greater than 0.1% and less than 1%, as percentage by weight based on the dry matter,
the content of first binder is between 2.5% and 4%, as percentage by weight based on the dry matter,
the content of impurities is less than 0.5%, preferably 0.1%, and
the residual moisture content is between 0.2% and 1%, preferably between 0.2% and 0.6%, as percentage by weight on the basis of the wet powder.

10. The powder as claimed in claim 1, in which the granules comprise particles in which the zirconia is stabilized.

11. The powder as claimed in claim 1, in which the granules incorporate zirconia particles for which the median diameter $D_{50}$ is less than 1 μm.

12. The powder as claimed in claim 1, in which the granules comprise alumina $Al_2O_3$, the alumina content being greater than 0.2% and less than 0.6%, as percentage by weight based on the dry matter.

13. The powder as claimed in claim 1, in which the first binder exhibits a glass transition temperature of greater than −30° C.

14. The powder as claimed in claim 1, in which the first binder exhibits a glass transition temperature of less than 15° C.

15. The powder as claimed in claim 1, in which the first binder is chosen from amorphous organic polymers, polyacrylic resins, polymers based on pure acrylates, copolymers based on acrylates and styrene, and their blends.

16. The powder as claimed in claim 1, in which the first binder is chosen from polyacrylic resins, polymers based on pure acrylates, copolymers based on acrylates and styrene, and their blends.

17. The powder as claimed in claim 1, in which the first binder is chosen from polyacrylic resins, copolymers based on acrylates and styrene, and their blends.

18. The powder as claimed in claim 1, in which the first binder and/or the additional binder are chosen from polymers not comprising inorganic elements.

19. The powder as claimed in claim 1, in which said temporary additive is an organic additive, the content of said organic additive being less than 1%, the total content of binder(s) and organic additive being less than 5%, said organic additive being chosen from dispersants or surfactants, thickeners, antifoaming agents, preservatives, lubricants and their mixtures.

20. The powder as claimed in claim 1, in which at least a portion of said stabilizer is replaced with an equivalent amount of precursor of said stabilizer.

21. The powder as claimed in claim 1, in which:
the median diameter $D_{50}$ is greater than 90 μm and less than 120 μm; and/or
the 10 percentile $D_{10}$ is greater than 40 μm; and/or
the 90 percentile $D_{90}$ is less than 300 μm; and/or
the 99.5 percentile $D_{99.5}$ is less than 400 μm.

22. The powder as claimed in claim 1, in which the residual moisture content is between 0.2% and 1%, as percentage by weight on the basis of the wet powder.

23. The powder as claimed in claim 1, in which more than 80% of the granules exhibit said chemical composition.

24. The powder as claimed in claim 1, in which the zirconia, the alumina, the first binder, the additional binder and the temporary additive are homogeneously distributed in the granules of the powder.

25. A process for the manufacture of a sintered part comprising the following stages:
A) mixing starting materials in order to form a starting charge comprising a powder comprising granules as claimed in claim 1, said powder comprising granules representing at least 60% of the weight of the starting charge,
B) forming a preform from said starting charge,
C) optionally machining said preform,
D) sintering said preform, so as to obtain said sintered part,
E) optionally machining and/or grinding said sintered part.

* * * * *